United States Patent
Le Gros et al.

(10) Patent No.: US 10,437,325 B2
(45) Date of Patent: Oct. 8, 2019

(54) RETINAL SEE THROUGH DISPLAY POWER LEVEL DETERMINATION METHOD AND APPARATUS

(71) Applicant: North Inc., Kitchener (CA)

(72) Inventors: Christophe Le Gros, Lausanne (CH); Gatien Cosendey, Vevey (CH)

(73) Assignee: North Inc., Kitchener, ON (CA)

(*) Notice: Subject to any disclaimer, the term of this patent is extended or adjusted under 35 U.S.C. 154(b) by 155 days.

(21) Appl. No.: 15/242,341

(22) Filed: Aug. 19, 2016

(65) Prior Publication Data
US 2018/0052513 A1   Feb. 22, 2018

(51) Int. Cl.
| | | |
|---|---|---|
| G06F 3/01 | (2006.01) | |
| G02B 27/00 | (2006.01) | |
| G02B 27/01 | (2006.01) | |
| G06K 9/00 | (2006.01) | |
| G06T 11/60 | (2006.01) | |

(52) U.S. Cl.
CPC ......... G06F 3/013 (2013.01); G02B 27/0093 (2013.01); G02B 27/0172 (2013.01); G06K 9/0061 (2013.01); G06T 11/60 (2013.01); *G02B 2027/014* (2013.01)

(58) Field of Classification Search
CPC . G06F 3/013; G02B 27/0093; G02B 27/0172; G02B 2027/014; G06K 9/0061; G06T 11/60
See application file for complete search history.

(56) References Cited

U.S. PATENT DOCUMENTS

| | | |
|---|---|---|
| 8,681,073 B1 | 3/2014 | Robbins et al. |
| 9,030,383 B2 | 5/2015 | Lindig et al. |
| 2007/0058261 A1 | 3/2007 | Sugihara et al. |
| 2011/0057863 A1 | 3/2011 | Sugihara et al. |
| 2013/0333266 A1 | 12/2013 | Gose et al. |
| 2015/0035744 A1 | 2/2015 | Robbins et al. |
| 2015/0187330 A1 | 7/2015 | Yang |
| 2016/0231573 A1* | 8/2016 | Mullins .............. H05B 37/0218 |

OTHER PUBLICATIONS

Cakmakci et al., "A Compact Optical See-through Head-Worn Display with Occlusion Support", International Symposium on Mixed and Augmented Reality, (2004), 10 pages.
Wearable Technology | The Next Megatrend, [online] Aug. 23, 2014 [Retrieved Nov. 30, 2016], http://plasticplus.ca/wp-content/uploads/2014/08/Wearable-Technology.pdf, 6 pages.
Watson et al., "A unified formula for light-adapted pupil size", Journal of Vision, Sep. 25, 2012, vol. 12, 16 pages.
International Search Report and Written Opinion dated Oct. 20, 2017 for International Application No. PCT/US2017/042900, 12 pages.

* cited by examiner

*Primary Examiner* — Aneeta Yodichkas
(74) *Attorney, Agent, or Firm* — Thomas Mahon (57) ABSTRACT

Apparatuses, methods and storage medium associated with retinal see through display are disclosed herein. In embodiments, an apparatus may comprise a retinal see through display wearable by a user; a target luminance calculator to determine a required luminance level; and a display power controller to determine a power level for the retinal see through display, based at least in part on a pupil size of the user and the determined required luminance level. Other embodiments may be described and/or claimed.

25 Claims, 6 Drawing Sheets

RETINAL SEE THROUGH DISPLAY POWER LEVEL DETERMINATION METHOD AND APPARATUS

TECHNICAL FIELD

The present disclosure relates to the field of display technology. More particularly, the present disclosure relates to retinal see through display power level determination method and apparatus.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Natural response of the human eye to a change in ambient brightness includes adaptation of the eye pupil diameter through action of the iris, yielding a change in retinal illumination. For optical display systems having an exit pupil smaller than the actual eye pupil size, the mechanism provided by nature would no longer work as the retinal illumination is no longer dependent on the eye pupil diameter.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Apparatuses, methods and storage medium associated with retinal see through display are disclosed herein. In embodiments, an apparatus may comprise a body wearable by a user, a retinal see through display disposed in the body; a target luminance calculator disposed in the body to determine a required luminance level; and a display power controller communicatively coupled with the target light calculator and the retinal see through display, and disposed in the body, to determine a power level for the retinal see through display, based at least in part on a pupil size of the user and the determined required luminance level.

In embodiments, the apparatus may further comprises sensors disposed in the body to sense local luminance level for a local area behind a virtual image, and the target luminance calculator may be communicatively coupled with the sensors to sense local luminance level, and determine a required luminance level based at least in part on the sensed local luminance level. In embodiments, the required luminance level may be determined based at least in part on the sensed local luminance level, using a required luminance model that models required luminance for various local luminance conditions.

In embodiments, the pupil size of the user may be estimated or detected. In estimated embodiments, the apparatus may further comprises sensors disposed in the body to sense ambient light level, and a pupil size calculator communicatively coupled with the sensors to sense ambient light level, and disposed in the body, to estimate the pupil size based at least in part on the sensed ambient light level. In embodiments, the pupil size may be estimated based at least in part on the sensed ambient light level using a model that models the pupil size for various ambient light conditions.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs having machine instructions (generated from assembler instructions or compiled from higher level language instructions), a combinational logic circuit, and/or other suitable components that provide the described functionality.

Figure 1:
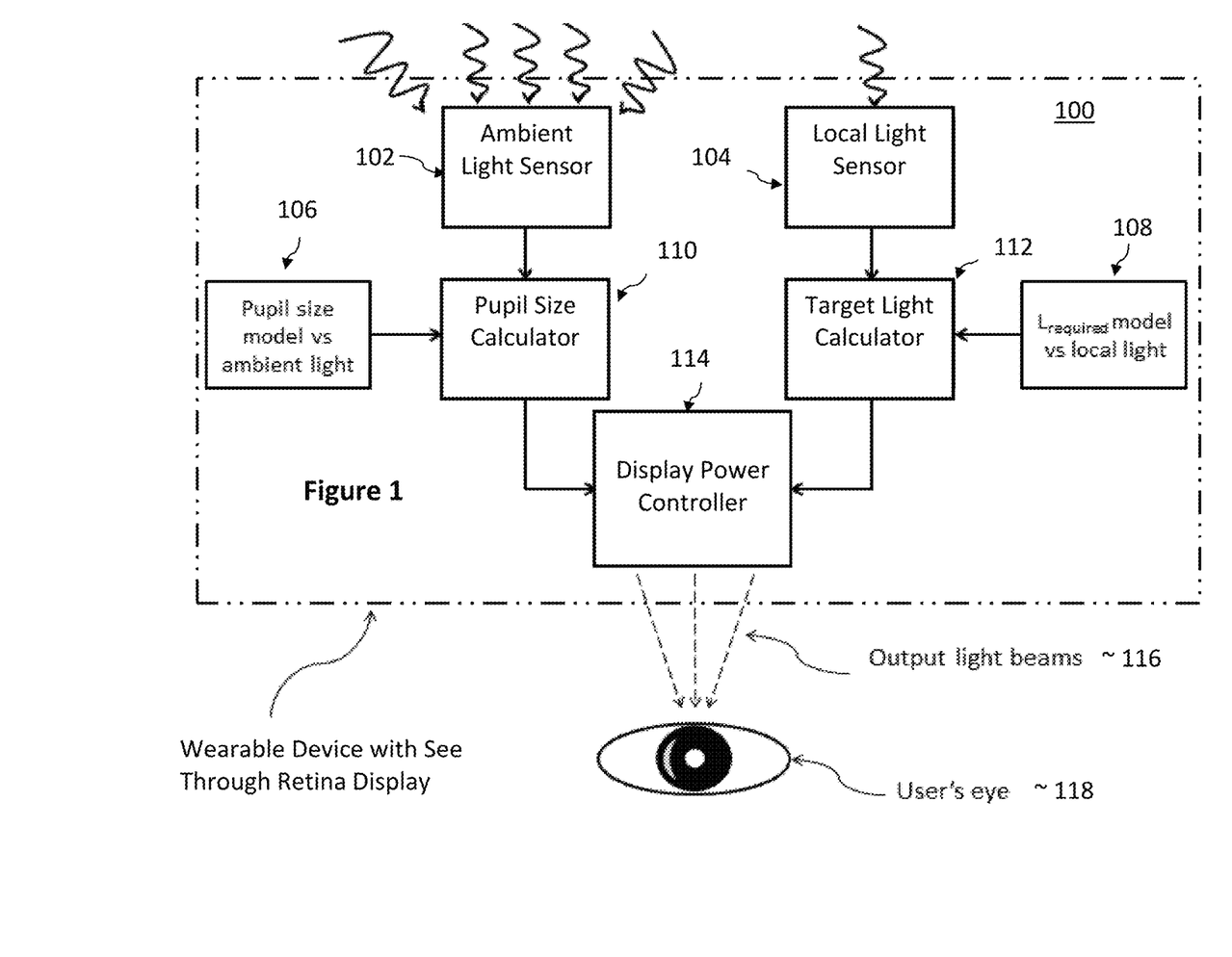
FIG. 1 illustrates the retinal see through display power determination technology of the present disclosure, according to various embodiments.

Referring now to FIG. 1, wherein the retinal see through display power determination technology of the present disclosure, according to various embodiments, is illustrated. As shown, in various embodiments, wearable device 100 may include retinal see through display (not shown in FIG. 1, see e.g., 406 in FIG. 4) having an exit pupil smaller than actual eye pupil size or within possible eye pupil size range (2-7 mm). Wearable device 100 may include further display power controller 114 configured to adaptively determine an appropriate power for the retinal see through display output light beams 116 of appropriate display luminance level to display images to user's eye 118. In embodiments, the power level may be determined to be the power level that provides for the display luminance level to approximate or equal the required luminance level, for a pupil size, as described more fully below.

In embodiments, to facilitate determination of the required luminance level, wearable device 100 may further include local light sensor 104 and target light calculator 112 communicatively coupled with each other, and with display power controller 114 as shown. Local light sensor 104 may be configured to sense and output local luminance level of a local area behind a displayed virtual image (see e.g., virtual image 304 displayed on the user's field of view 302 illustrated on the right hand side of FIG. 3). In embodiments, local light sensor 104 may be any one of a number of suitable light sensors known in the art configurable to be coupled to a light pipe designed to have an acceptance angle consistent (e.g., matching) the displayed image of view. An example of such light sensors may include, but is not limited to, the Light To Digital Converters available from AMS TAOS of Premstaetten, Austria.

In embodiments, target luminance calculator 112 may be configured to determine the required luminance level ($L_{required}$), based at least in part on the sensed local luminance level ($L_{local}$). In embodiments, target luminance calculator 112 may determine the required luminance level, using a required luminance level model 108 that models required luminance level for various local luminance levels.

In embodiments, $L_{required}$ may be determined using an empirical model represented by the following formula:

$$L_{required} = \sqrt{\frac{4.10^{8/8} \cdot L_{local\_eye} p^2}{w}} \quad (1)$$

where w is the virtual image solid angle in steradian,
p is an index which depends on the position of the virtual image in the user's field of view (FOV), and
$L_{local\_eye}$ may be the local luminance level perceived by user's eye 118, which may be a percentage of the sensed local luminance level.

For example, if wearable device 100 is an eyeglass, which lens has a tint of 18% transmission, $L_{local\_eye}$ would be 18% of the sensed local luminance level. The determined $L_{required}$ provides for virtual image contrast on top of the field of view background.

In alternate embodiments, other required luminance level models may be used.

In embodiments, display power controller 114 may be configured to select a power level for retinal see through display, such that the display luminance level approximates or equals the required luminance level, for a pupil size.

As described earlier, the exit pupil of the retinal see through display is smaller than the user's eye pupil, thus technology of the present disclosure adapt the display luminance depending on the size of the eye pupil of the user. In embodiment, the optimum power $P_{opt}$ of the retinal see through display to provide the display luminance to approximate or equal the required luminance may be determined using the following formulas (see left hand side 310 of FIG. 3):

$$L = \frac{K_M}{A \cdot \Omega} \int_{380}^{780} P_{opt}(\lambda) V(\lambda) d\lambda \quad (2)$$

$$A \; 2D\tan(\theta_h/2) \cdot 2D\tan(\theta_v/2) \quad (3)$$

$$\Omega = \frac{d^2 \pi}{4D^2} \quad (4)$$

Figure 3:
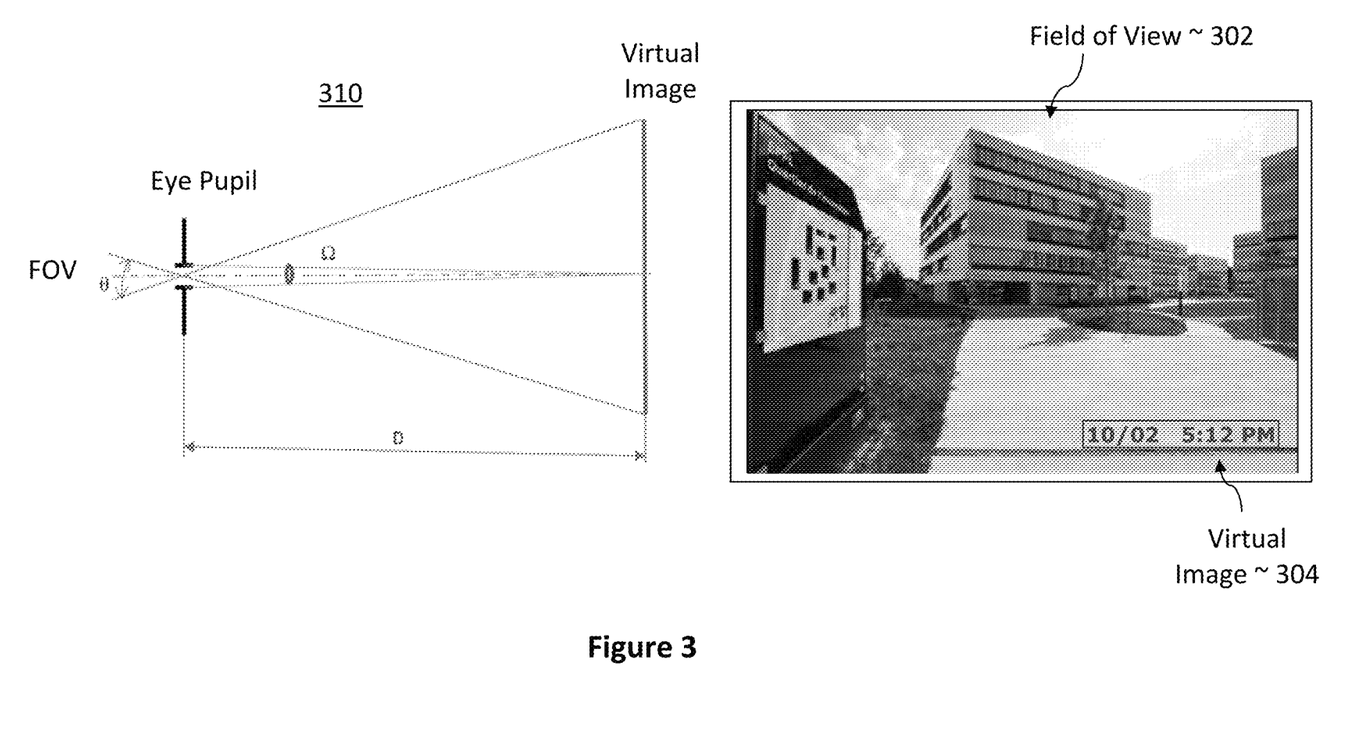
FIG. 3 illustrates determination of display luminance, according to various embodiments.

Accordingly, $$L = \frac{K_M}{\tan(\theta_h/2)\tan(\theta_v/2)d^2\pi} \int_{380}^{780} P_{opt}(\lambda) V(\lambda) d\lambda \quad (5)$$

where L is the display luminance level;
$P_{opt}(\lambda)$ is a spectral distribution of optical power incident onto the eye pupil;
$K_M$ is a factor which is equal to 683.002 lm/W and is the maximal photopic spectral luminous efficacy, corresponding to lambda=555 nm;
Virtual image surface: A
Solid angle defined by eye pupil: $\Omega$
Photopic Spectral Luminous efficiency: $V(\lambda)$
Eye pupil diameter: d
Vert. (hor.) FOV: $\theta_v$ ($\theta_h$)

In embodiments, a lookup table of $P_{opt}$ to provide various display luminance for various pupil size may be pre-computed and pre-provided to display power controller 114, using the above formulas, e.g., at manufacturing time, at initial set up time, or during power on initialization. In alternate embodiments, $P_{opt}$ may be computed in real time.

Continuing to refer to FIG. 1, in embodiments, wearable device 100 may further include ambient light sensor 102 and pupil size calculator 110 communicatively coupled with each other, and with display power controller 114 as shown. In embodiments, ambient light sensor 102 may be configured to sense and output ambient light level. In embodiments, similar to local light sensor 104, ambient light sensor 102 may be any one of a number of suitable light sensors known in the art.

In embodiments, pupil size calculator 110 may be configured to estimate the pupil size of the user, based at least in part on the sensed ambient light level. In embodiments, pupil size calculator 110 may estimate the user's pupil size, using a pupil size model 106 that models pupil sizes for various ambient light levels.

In embodiments, pupil size model 106 may be represented by the following formula:

$$D_U = \frac{18.5172 + 0.122165f - 0.105569y + 0.000138645fy}{2 + 0.0630635g} \quad y \geq 20 \quad (6)$$

$$(27)$$

with $f = F^{0.41} = [LaM(e)]^{0.41}$ where $D_u$ is the diameter of the pupil size, F is the effective corneal flux density, and f is F elevated to the power of 0.41.

$$\begin{cases} \text{Ambient luminance } L(cd/m^2) \\ \text{Field area: } a \ (deg^2) \\ \text{Monocular effect: } M(1) = 0.1, M(2) = 1 \\ \text{Age: } y \ (\text{years}) \end{cases}$$

Ambient luminance L is the parameter detected by ambient light sensors 102. The field area is the user's FOV (field of view), in square degrees. A typical value may be between 60° ~2700 square degrees. Monocular effect means either one eye, or two eyes. The age of the user may be provided by the user. In embodiments, a reference or defaulted value, e.g., 30 years old, may be used instead. The result ($D_u$), is the corresponding user pupil size in mm. See *A unified formula for light-adapted pupil size* by Watson and Yellott, *Journal of Vision* (2012), 12(10); 12, 1-16 for further information.

In alternate embodiments, other pupil size models may be used.

Figure 2:
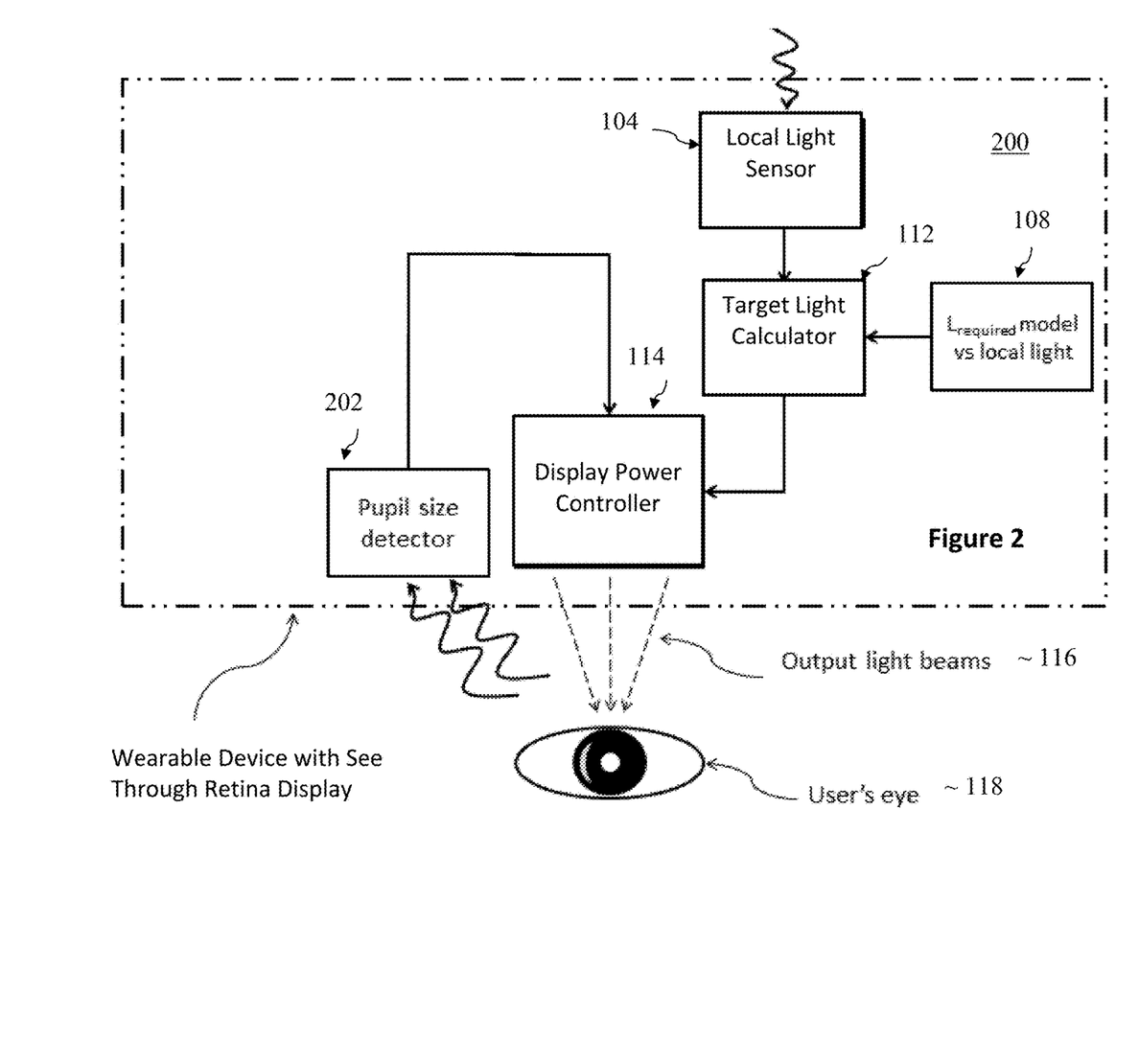
FIG. 2 illustrates the retinal see through display power determination technology of the present disclosure, according to various other embodiments.

Referring now to FIG. 2, wherein the retinal see through display power determination technology of the present disclosure, according to various other embodiments, is illustrated. Similar to wearable device 100, wearable device 200 may include retinal see through display (not shown in FIG. 2, see e.g., 406 in FIG. 4) having an exit pupil smaller than actual eye pupil size or within possible eye pupil size range (2-7 mm). Further, like wearable device 100, wearable device 200 may include display power controller 114, local light sensors 104 and target light calculator 112. Display power controller 114, local light sensors 104 and target light calculator 112 may be similarly constituted and perform the same functions, as earlier described.

However, unlike wearable device 100, wearable device 200 include pupil size detector 202, in lieu of ambient light sensor 102 and pupil size calculator 110. Pupil size detector 202 may be configured to detect (measure) the user's pupil size directly. Pupil size detector 202 may be any one of a number of suitable detectors known in the art.

Figure 4:
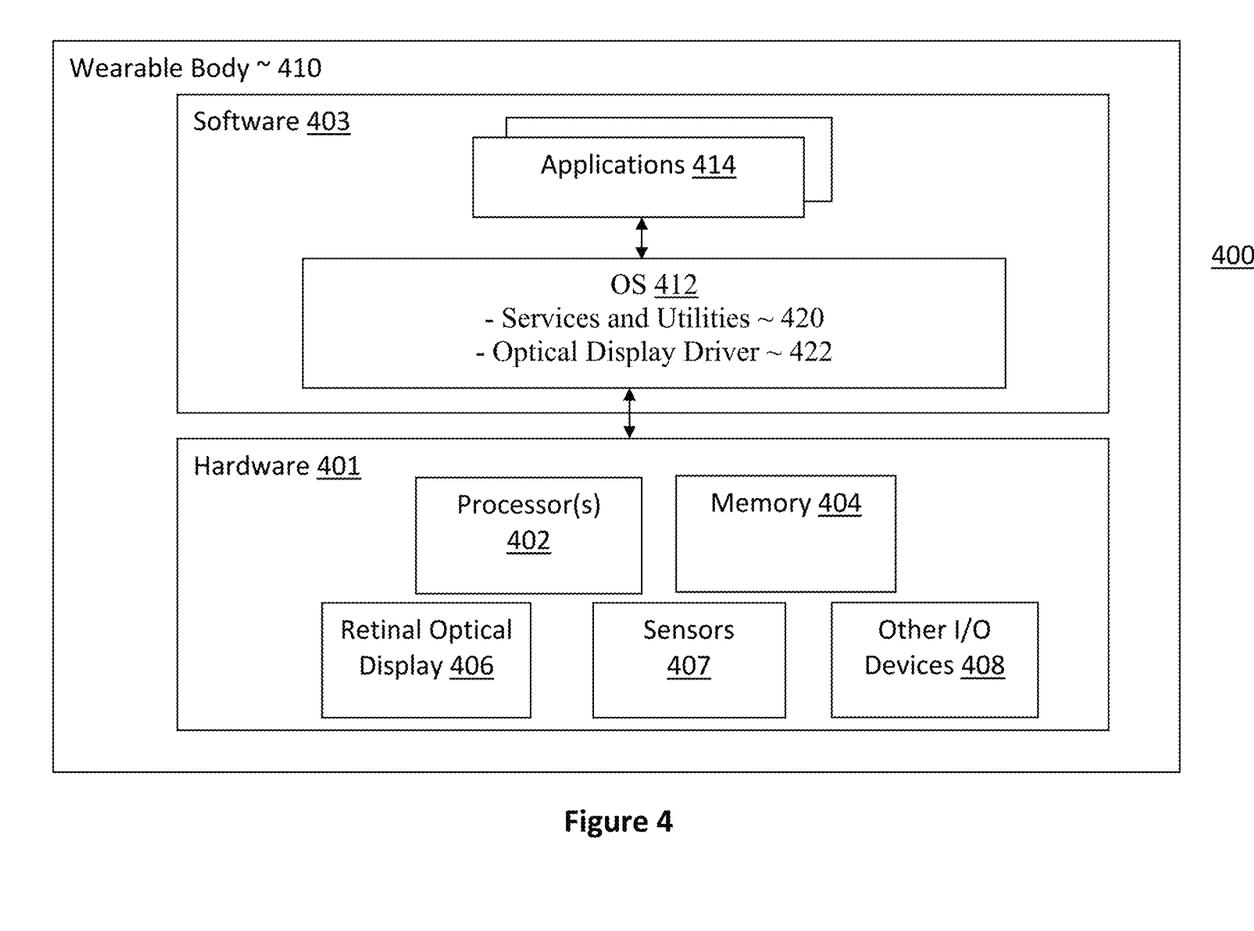
FIG. 4 illustrates a component view of a wearable device having the retinal see through display power determination technology of the present disclosure, according to various embodiments.

Referring now to FIG. 4, wherein a component view of a wearable device having the retinal see through display power determination technology of the present disclosure, according to various embodiments, is illustrated. As shown, wearable device 400 may include wearable body 410 hosting hardware 401, i.e., hardware 401 are disposed on or within wearable body 410. Hardware 401 in turn may host software 403. In embodiments, hardware 401 may include one or more processors 402, memory 404, retinal optical display 406, sensors 407 and other I/O devices 408. Software 403 may include operating system (OS) 412 and application 414. In embodiments, the wearable body 410 may be a pair of eyeglasses or goggles.

Processor(s) 402 may be any one of a number of processors known in the art, having one or more processor cores. Memory 404 may be any volatile or non-volatile memory known in the art, suitable for storing instructions and/or data, e.g., instructions and/or data of OS 412 and/or applications 414. Except for its power being optimally controlled, retinal optical display 406 may otherwise be any one of a number of retinal optical display known in the art. Sensors 407 may be sensors 102 and 104 and/or pupil size detector 202 of FIGS. 1 and 2. As described earlier, they may be any one of a number of known sensors suitable for sensing ambient and local lights, and/or detecting pupil size of a user. Other I/O devices 408 may include e.g., but are not limited to, Global Positioning System (GPS), gyroscope, accelerometer, compass, or communication or networking interfaces, such as WiFi, 3G/4G, Bluetooth®, Near Field Communication, Universal Serial Bus (USB) and so forth.

OS 412 may include a number of services and utilities 420, in particular, optical display driver 422, incorporated with the teachings of the present disclosure, e.g., pupil size calculator 110, target light calculator 112 and display power controller 114 of FIGS. 1 and 2. Except for optical display driver 422, OS 112 may be any one of a number of OS known in the art, e.g., the Windows OS from Microsoft® Corporation. Applications 114 may likewise be any one of a number of applications known in the art.

Figure 5:
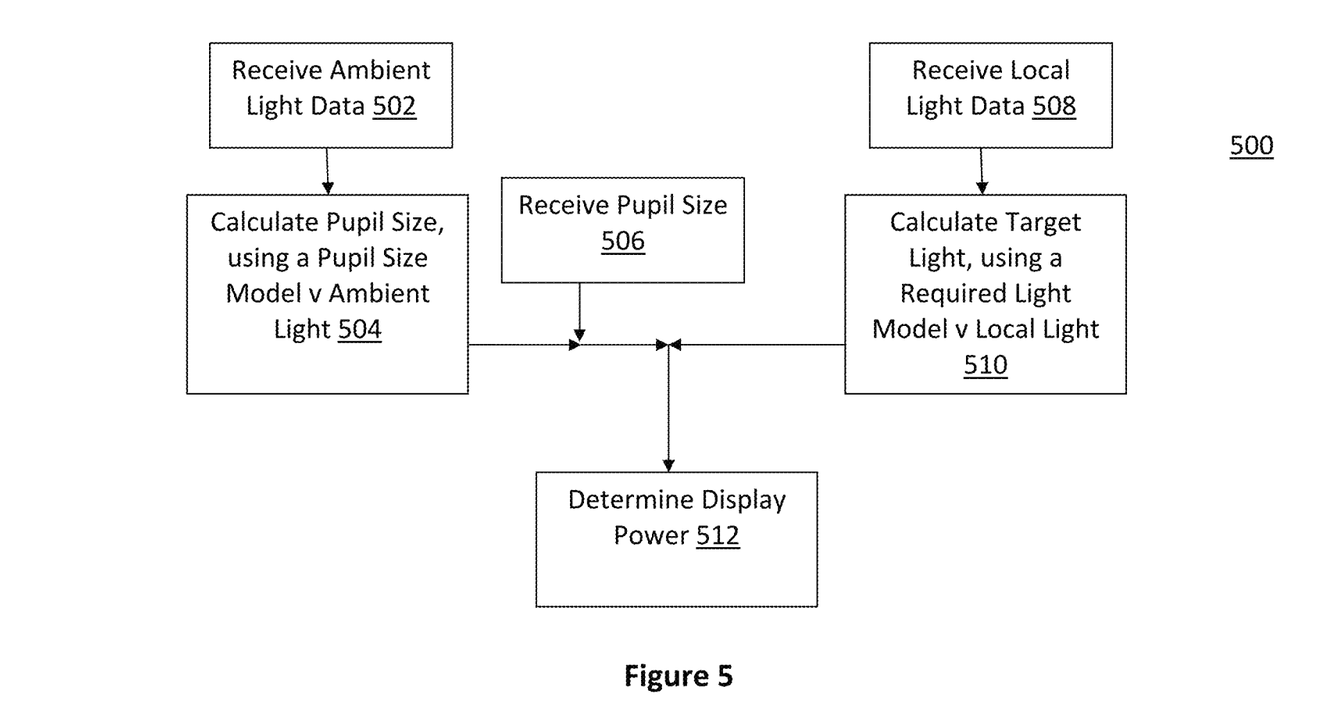
FIG. 5 illustrates an example process for determining power of a retinal see through display, according to various embodiments.

Referring now to FIG. 5, wherein a process for determining optimal power for a retinal see through optical display, according to various embodiments, is illustrated. As shown, process 500 for determining optimal power for a retinal see through optical display may include operations performed at blocks 502-512. The operations may be performed e.g., by the earlier described optical device driver 422 of FIG. 4 (having pupil size calculator 110, target light calculator 112 an/or display power controller 114). Accordingly, FIG. 5 also depicts the algorithmic structure of optical device driver 422 and its components.

As shown, process 500 may start at block 502, 506 or 508. At block 502, sensed ambient light data may be received. At bock 506, detected pupil size of a user may be received. At block 510, sense local light data 510 may be received.

From block 502, process 500 may proceed to block 504. At block 504, the pupil size of the user may be calculated/estimated. The pupil size of the user may be calculated/estimated using a pupil size model that models pupil sizes for various ambient light conditions. As described earlier, in some embodiments, the pupil size model may be represented by the earlier described equation (6).

From block 508, process 500 may proceed to block 510. At block 510, the required luminance level may be calculated/estimated. The required luminance level may be calculated/estimated using a required luminance model that models required luminance level for various local luminance levels. As described earlier, in some embodiments, the required luminance model may be represented by the earlier described equation (1).

From block 504 or 506, and from block 510, process 500 may proceed to block 512. At block 512, the optimal power of retinal see through display may be determined. In embodiments, the optimal power may be the power that provides a display luminance level that approximates/equals the required luminance level for the user's pupil size. As described earlier, the determination may be performed by retrieving the optimal power from a lookup table pre-calculated in accordance with equations 5. In alternate embodiments, the calculations may be performed in real time (e.g., by a photodiode embedded in one of sensors 407 in FIG. 4).

As will be appreciated by one skilled in the art, aspects of the present disclosure may be embodied as methods or computer program products. Accordingly, aspects of the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, aspects of the present disclosure may take the form of a computer program product embodied in any tangible or non-transitory medium of expression having computer-usable program code embodied in the medium.

Figure 6:
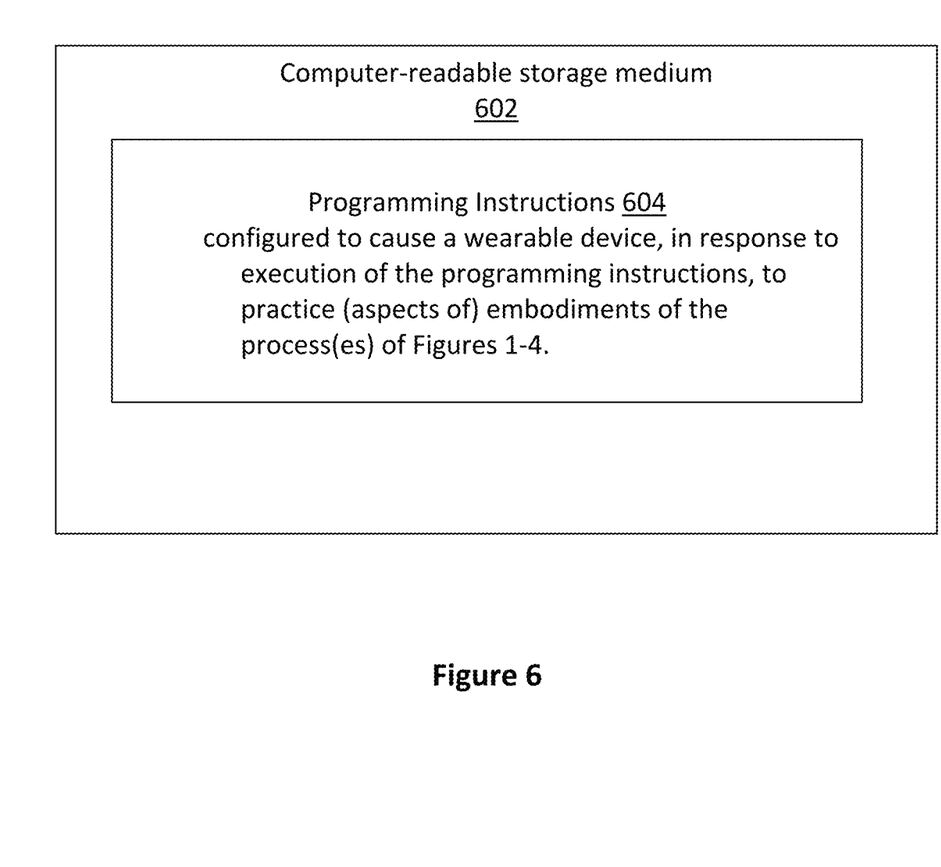
FIG. 6 illustrates a storage medium having instructions for practicing methods described with references to FIGS. 1-3, according to various embodiments.

FIG. 6 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 602 may include a number of programming instructions 604. Programming instructions 604 may be configured to enable a wearable device, e.g., wearable device 500, in response to execution of the programming instructions, to implement (aspects of) OS 412, such as optical display driver 422. In alternate embodiments, programming instructions 604 may be disposed on multiple computer-readable non-transitory storage media 602 instead. In still other embodiments, programming instructions 604 may be disposed on computer-readable transitory storage media 602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's wearable device, partly on the user's wearable device, as a stand-alone software package, partly on the user's wearable device and partly on a remote computer or entirely on the remote computer or server. In the latter scenario, the remote computer may be connected to the user's wearable device through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Referring back to FIG. 4, for one embodiment, at least one of processors 402 may be packaged together with memory having aspects of optical display driver 422. For one embodiment, at least one of processors 402 may be packaged together with memory having aspects of optical display driver 422, to form a System in Package (SiP). For one embodiment, at least one of processors 402 may be integrated on the same die with memory having aspects of optical display driver 422. For one embodiment, at least one of processors 402 may be packaged together with memory having aspects of optical display driver 422, to form a System on Chip (SoC). Thus various example embodiments of the present disclosure have been described including, but are not limited to:

Example 1 may be an apparatus for displaying images, comprising: a body wearable by a user; a retinal see through display disposed in the body; a target light calculator disposed in the body to determine a required luminance level; and a display power controller communicatively coupled with the target light calculator and the retinal see through display, and disposed in the body, to determine a power level for the retinal see through display to display images, based at least in part on a pupil size of the user and the determined required luminance level.

Example 2 may be example 1, further comprising one or more ambient light sensors disposed in the body to sense ambient light and output sensed ambient light data, and a pupil size calculator coupled to the one or more ambient light sensors, and disposed in the body, to estimate the pupil size of the user; wherein the pupil size calculator may estimate the pupil size based at least in part on the sensed ambient light data.

Example 3 may be example 2, wherein the pupil size calculator may estimate the pupil size based at least in part on the sensed ambient light data, using a pupil size model that models pupil sizes for various ambient light conditions.

Example 4 may be example 1, further comprising a pupil size detector disposed in the body to detect and output the pupil size of the user.

Example 5 may be example 1, further comprising one or more local light sensors disposed in the body to sense local light and output sensed local light data associated with a local area behind a displayed virtual image; wherein the target light calculator may determine the required luminance level, based at least in part on the sensed local light data associated with the local area behind the displayed virtual image.

Example 6 may be example 5, wherein the target light calculator may determine the required luminance level, based at least in part on the sensed local light data, using a required light model that models required light for various local light conditions.

Example 7 may be any one of examples 1-6; wherein the display power controller may determine the power level of the retinal see through display, such that a display luminance level approximates the determined required luminance level, for the pupil size of the user.

Example 8 may be example 7, further comprising a processor disposed in the body, wherein the target light calculator may be a software target light calculator operated by the processor, and the display power controller may be a software display power controller operated by the processor.

Example 9 may be example 8, wherein the target light calculator and the display power controller may be part of an optical display driver.

Example 10 may be example 7, wherein the display power controller includes or may have access to a lookup table of pre-calculated powers to provide various display luminance levels for various pupil sizes.

Example 11 may be a method for displaying images, comprising: determining, by a wearable device, a required luminance level; and determining, by the wearable device, a power level of a retinal see through display of the wearable device to display images, based at least in part on a pupil size of a user and the determined required luminance level.

Example 12 may be example 11, further comprising sensing ambient light and outputting sensed ambient light data with one or more ambient light sensors disposed in a body of the wearable device, and estimating the pupil size of the user, based at least in part on the sensed ambient light data.

Example 13 may be example 12, wherein estimating may comprise estimating the pupil size based at least in part on the sensed ambient light data, using a pupil size model that models pupil sizes for various ambient light conditions.

Example 14 may be example 11, further comprising detecting and outputting the pupil size of the user using a pupil size detector disposed in a body of the wearable device.

Example 15 may be example 11, further comprising sensing local light and outputting sensed local light data associated with a local area behind a displayed virtual image, using one or more local light sensors disposed in a body of the wearable device; wherein determining a required luminance level may comprise determining the required luminance level, based at least in part on the sensed local light data associated with the local area behind the displayed virtual image.

Example 16 may be example 15, wherein determining the required luminance level may comprise determining the required luminance level, based at least in part on the sensed local light data, using a required light model that models required light for various local light conditions.

Example 17 may be any one of examples 11-16; wherein determining a power level may comprise determining a power level of the retinal see through display, such that a display luminance level approximates the determined required luminance level, for the pupil size of the user.

Example 18 may be example 17, wherein determining a power level may comprise accessing a lookup table of pre-calculated powers to provide various display luminance levels for various pupil sizes, to retrieve the power level.

Example 19 may be one or more computer-readable media comprising instructions that cause a wearable device, in response to execution of the instructions by the wearable device, to: determine a required luminance level; and determine a power level of a retinal see through display of the wearable device to display images, based at least in part on a pupil size of a user and the determined required luminance level.

Example 20 may be example 19, wherein the wearable device may comprise one or more ambient light sensors disposed in a body of the wearable device to sense ambient light and output sensed ambient light data; and wherein the wearable device may be further caused to estimate the pupil size of the user, based at least in part on the sensed ambient light data.

Example 21 may be example 20, wherein the wearable device may be further caused to estimate the pupil size based at least in part on the sensed ambient light data, using a pupil size model that models pupil sizes for various ambient light conditions.

Example 22 may be example 19, wherein the wearable device may comprise a pupil size detector disposed in a body of the wearable device to detect and output the pupil size of the user.

Example 23 may be example 19, wherein the wearable device may comprise one or more local light sensors disposed in the body to sense local light and output sensed local light data associated with a local area behind a displayed virtual image; wherein the wearable device may be further caused to determine the required luminance level, based at least in part on the sensed local light data associated with the local area behind the displayed virtual image.

Example 24 may be example 23, wherein the wearable device may be further caused to determine the required luminance level, based at least in part on the sensed local light data, using a required light model that models required light for various local light conditions.

Example 25 may be any one of examples 19-24; wherein the wearable device may be further caused to determine the power level of the retinal see through display, such that a display luminance level approximates the determined required luminance level, for the pupil size of the user.

Example 26 may be example 25, further comprising a lookup table of pre-calculated powers to provide various display luminance levels for various pupil sizes.

Example 27 may be an apparatus for displaying images, comprising: means for determining a required luminance level; and means for determining a power level of a retinal see through display of the apparatus, based at least in part on a pupil size of a user and the determined required luminance level.

Example 28 may be example 27, further comprising means for sensing ambient light and outputting sensed ambient light data with one or more ambient light sensors disposed in a body of the wearable device, and means for estimating the pupil size of the user, based at least in part on the sensed ambient light data.

Example 29 may be example 28, wherein means for estimating may comprise means for estimating the pupil size based at least in part on the sensed ambient light data, using a pupil size model that models pupil sizes for various ambient light conditions.

Example 30 may be example 27, further comprising means for detecting and outputting the pupil size of the user using a pupil size detector disposed in a body of the wearable device.

Example 31 may be example 27, further comprising means for sensing local light and outputting sensed local light data associated with a local area behind a displayed virtual image, using one or more local light sensors disposed in a body of the wearable device; wherein means for determining a required luminance level may comprise means for determining the required luminance level, based at least in part on the sensed local light data associated with the local area behind the displayed virtual image.

Example 32 may be example 31, wherein means for determining the required luminance level may comprise means for determining the required luminance level, based at least in part on the sensed local light data, using a required light model that models required light for various local light conditions.

Example 33 may be any one of examples 27-32; wherein means for determining a power level may comprise means for determining a power level of the retinal see through display, such that a display luminance level approximates the determined required luminance level, for the pupil size of the user.

Example 34 may be example 33, wherein means for determining a power level may comprise means for accessing a lookup table of pre-calculated powers to provide various display luminance levels for various pupil sizes, to retrieve the power level.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus for displaying images, comprising:
   a body wearable by a user;
   a retinal see through display disposed in the body, including a tinted lens having a visible light transmission rate:
   a target light calculator disposed in the body to determine a required luminance level for output of the retinal see through display, based at least in part on sensed luminance of local light in a local area behind a displayed virtual image, and the visible light transmission rate of the tinted lens of the retinal see through display; and
   a display power controller communicatively coupled with the target light calculator and the retinal see through display, and disposed in the body, to determine a power level for the retinal see through display to display images, based at least in part on a pupil size of the user and the determined required luminance level, wherein the pupil size is either measured or calculated based on sensed luminance of ambient light in an immediate surrounding of the user, the immediate surrounding being larger and includes the local area behind the displayed virtual image.

2. The apparatus of claim 1, further comprising
   one or more local light sensors coupled to the target light calculator, and disposed in the body, to sense the luminance of local light in the local area behind the displayed virtual image;
   one or more ambient light sensors disposed in the body to sense luminance of the ambient light in the immediate surrounding of the user, and output sensed ambient light luminance data; and
   a pupil size calculator coupled to the one or more ambient light sensors and to the display power controller, and disposed in the body, to estimate the pupil size of the user;
   wherein the pupil size calculator is to estimate the pupil size based at least in part on the sensed ambient light luminance data.

3. The apparatus of claim 2, wherein the pupil size calculator is to estimate the pupil size based at least in part on the sensed ambient light luminance data, using a pupil size model that models pupil sizes for various ambient light conditions.

4. The apparatus of claim 1, further comprising a pupil size detector coupled to the display power controller, and disposed in the body to detect and output the pupil size of the user.

5. The apparatus of claim 1, further comprising
   one or more local light sensors coupled to the target light calculator, and disposed in the body, to sense the luminance of the local light and output sensed local light luminance data associated with the local area behind the displayed virtual image and
   a selected one of one or more ambient light sensors or pupil size detector, wherein the one or more ambient light sensors are disposed in the body to sense the luminance of the ambient light and output sensed ambient light luminance data to a pupil size calculator that estimates the pupil size of the user, based at least in part on the sensed ambient light luminance data.

6. The apparatus of claim 5, wherein the target light calculator is to determine the required luminance level, based at least in part on the sensed local light luminance data, using a required light model that models required light for various local light conditions for the local area behind the displayed virtual image.

7. The apparatus of claim 1; wherein the display power controller is to determine the power level of the retinal see through display, such that a display luminance level approximates the determined required luminance level, for the pupil size of the user.

8. The apparatus of claim 7, further comprising a processor disposed in the body, wherein the target light calculator is a software target light calculator operated by the processor, and the display power controller is a software display power controller operated by the processor.

9. The apparatus of claim 8, wherein the target light calculator and the display power controller are part of an optical display driver.

10. The apparatus of claim 7, wherein the display power controller includes or has access to a lookup table of pre-calculated powers to provide various display luminance levels for various pupil sizes.

11. A method for displaying images, comprising:
determining, by a wearable device, a required luminance level for output of a retinal see through display of the wearable device, the retinal see through display having a tinted lens with a visible light transmission rate, and the determining of the required luminance level is based at least in part on sensed luminance of local light in a local area behind a displayed virtual image, and the visible light transmission rate of the tinted lens of the retinal see through display; and
determining, by the wearable device, a power level of a retinal see through display of the wearable device to display images, based at least in part on a pupil size of a user and the determined required luminance level, wherein the pupil size is either measured or calculated based on sensed luminance of ambient light in an immediate surrounding the user is in the immediate surrounding being larger and includes the local area behind the displayed virtual image.

12. The method of claim 11, further comprising
sensing the local light in the local area behind the displayed virtual image, and outputting sensed local light luminance data, with one or more local light sensors disposed in a body of the wearable device;
sensing the ambient light of the immediate surrounding of the user, and outputting sensed ambient light luminance data, with one or more ambient light sensors disposed in a body of the wearable device; and
estimating the pupil size of the user, based at least in part on the sensed ambient light luminance data.

13. The method of claim 12, wherein estimating comprises estimating the pupil size based at least in part on the sensed ambient light luminance data, using a pupil size model that models pupil sizes for various ambient light conditions.

14. The method of claim 11, further comprising detecting and outputting the pupil size of the user using a pupil size detector disposed in a body of the wearable device.

15. The method of claim 11, further comprising sensing the luminance of the local lights and outputting sensed local light luminance data associated with the local area behind the displayed virtual image, using one or more local light sensors disposed in a body of the wearable device; and
performing a selected one of:
sensing the luminance of the ambient light and outputting sensed ambient light luminance data to a pupil size calculator, using one or more ambient light sensors, wherein the pupil size calculator estimates the pupil size of the user, based at least in part on the sensed ambient light luminance data, or
detecting the pupil size of the user with a pupil size detector.

16. The method of claim 15, wherein determining the required luminance level comprises determining the required luminance level, based at least in part on the sensed local light luminance data, using a required light model that models required light for various local light conditions for the local area behind the displayed virtual image.

17. The method of claim 11; wherein determining a power level comprises determining a power level of the retinal see through display, such that a display luminance level approximates the determined required luminance level, for the pupil size of the user.

18. The method of claim 17, wherein determining a power level comprises accessing a lookup table of pre-calculated powers to provide various display luminance levels for various pupil sizes, to retrieve the power level.

19. One or more non-transitory computer-readable media comprising instructions that cause a wearable device, in response to execution of the instructions by the wearable device, to:
determine a required luminance level for output of a retinal see through display of the wearable device, the retinal see through display having a tinted lens with a visible light transmission rate, and the determining of the required luminance level is based at least in part on sensed luminance of local light in a local area behind a displayed virtual image, and the visible light transmission rate of the tinted lens of the retinal see through display; and
determine a power level of a retinal see through display of the wearable device to display images, based at least in part on a pupil size of a user and the determined required luminance level, wherein the pupil size is either measured or calculated based on sensed luminance of ambient light in an immediate surrounding the user is in the immediate surrounding being larger and includes the local area behind the displayed virtual image.

20. The one or more non-transitory computer-readable media of claim 19, wherein the wearable device comprises one or more local light sensors and one or more ambient light sensors disposed in a body of the wearable device, wherein the one or more local light sensors are to sense the luminance of local light in the local area behind the displayed virtual image, and the one or more ambient light sensors are to sense the luminance of the ambient light and output sensed ambient light luminance data; and wherein the wearable device is further caused to estimate the pupil size of the user, based at least in part on the sensed ambient light luminance data.

21. The one or more non-transitory computer-readable media of claim 20, wherein the wearable device is further caused to estimate the pupil size based at least in part on the sensed ambient light data, using a pupil size model that models pupil sizes for various ambient light conditions.

22. The one or more non-transitory computer-readable media of claim 19, wherein the wearable device comprises a pupil size detector disposed in a body of the wearable device to detect and output the pupil size of the user.

23. The one or more non-transitory computer-readable media of claim 19, wherein the wearable device comprises
- one or more local light sensors disposed in the body to sense the luminance of the local light and output sensed local light luminance data associated with the local area behind the displayed virtual image; and
- a selected one of one or more ambient light sensors or pupil size detector, wherein the one or more ambient light sensors are disposed in the body to sense the luminance of the ambient light and output sensed ambient light luminance data to a pupil size calculator that estimates the pupil size of the user, based at least in part on the sensed ambient light luminance data.

24. The one or more non-transitory computer-readable media of claim 23, wherein the wearable device is further caused to determine the required luminance level, based at least in part on the sensed local light luminance data, using a required light model that models required light for various local light conditions for the local area behind the displayed virtual image.

25. The one or more non-transitory computer-readable media of claim 19; wherein the wearable device is further caused to determine the power level of the retinal see through display, such that a display luminance level approximates the determined required luminance level, for the pupil size of the user.

* * * * *